Aug. 30, 1932.　　　E. R. MAURER ET AL　　　1,874,327
INTERNAL COMBUSTION ENGINE
Filed Oct. 7, 1929　　　2 Sheets-Sheet 1
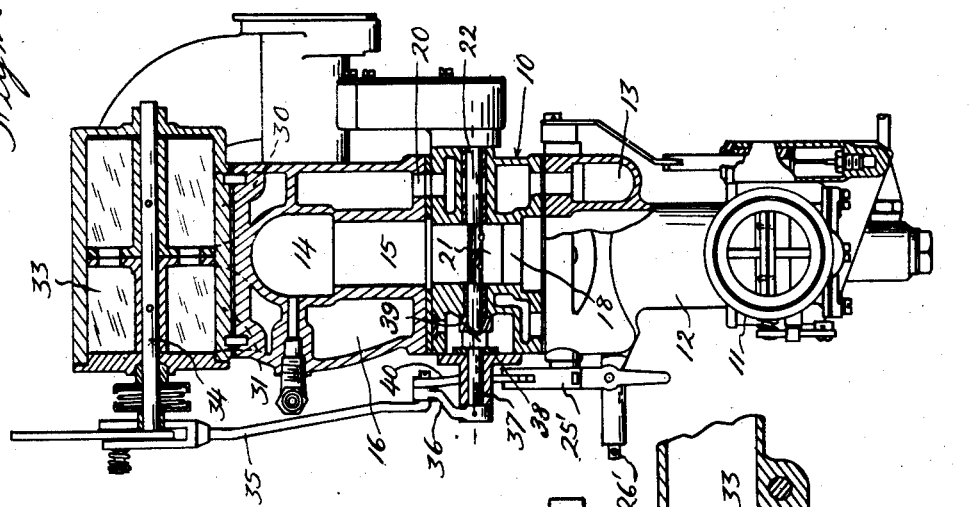
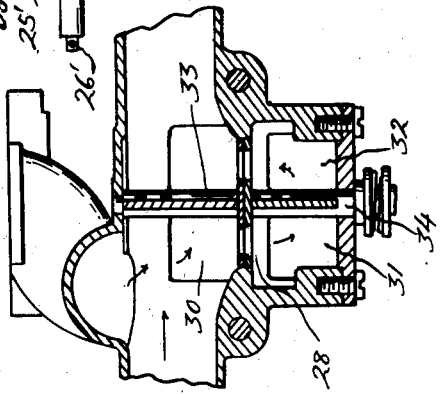
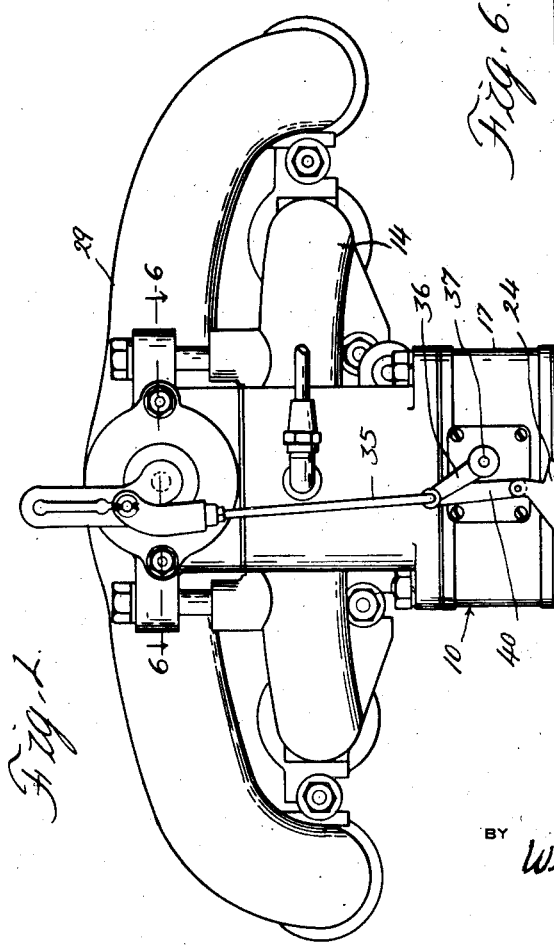
INVENTORS
Edwin R. Maurer
Donald M. Ferguson
BY Whittemore Hulbert Whittemore
& Belknap
ATTORNEYS Aug. 30, 1932.  E. R. MAURER ET AL  1,874,327
INTERNAL COMBUSTION ENGINE
Filed Oct. 7, 1929   2 Sheets-Sheet 2
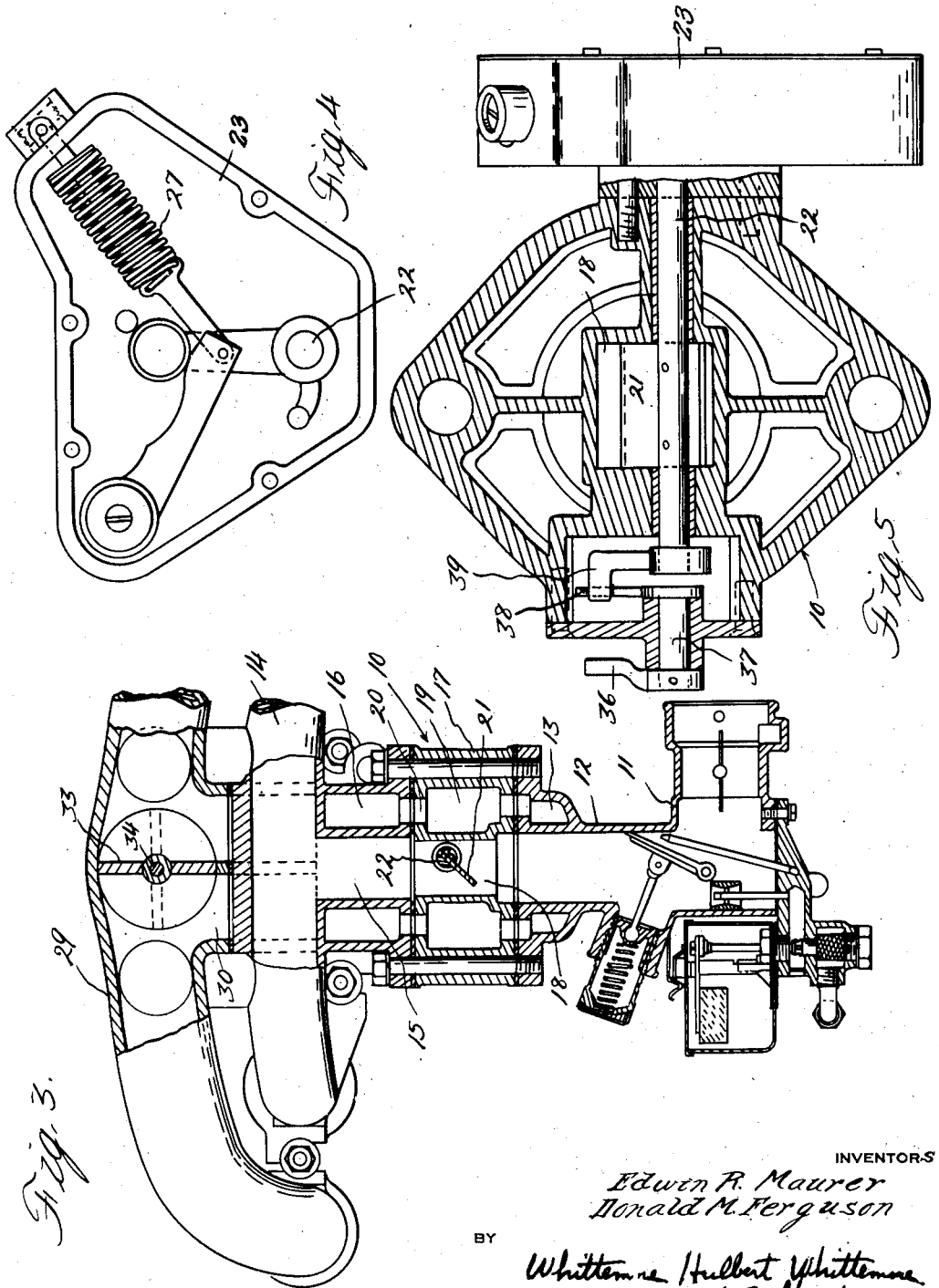
INVENTORS
Edwin R. Maurer
Donald M. Ferguson
BY
Whittemore Hulbert Whittemore
+ Belknap
ATTORNEYS Patented Aug. 30, 1932

1,874,327

UNITED STATES PATENT OFFICE

EDWIN R. MAURER, OF DETROIT, AND DONALD M. FERGUSON, OF HIGHLAND PARK, MICHIGAN, ASSIGNORS, BY MESNE ASSIGNMENTS, TO CONTINENTAL-DIVCO COMPANY, OF DETROIT, MICHIGAN, A CORPORATION OF MICHIGAN

INTERNAL COMBUSTION ENGINE

Application filed October 7, 1929. Serial No. 398,053.

This invention relates to apparatus for introducing fuel into internal combustion engines and for controlling the operation of the engine.

One of the primary objects of this invention is to provide a carburetor, governor and manifold assembly adapted to cause efficient operation of the engine not only at the speeds determined by the governor but also at the idling speeds.

Another object is to provide fuel induction apparatus particularly designed for use on house to house delivery vehicles where it is necessary to maintain the engine running all of the time whether the vehicle is moving or stationary.

A further object of this invention is to provide an automatic governed fuel induction device wherein the position of the governor member determines the amount of heat by-passed around the fuel intake conduit.

The foregoing as well as other objects will be made more readily apparent as this description proceeds especially when considered in connection with the accompanying drawings wherein Figure 1 is a front elevational view of a fuel feeding apparatus constructed in accordance with this invention.

Figure 2 is a sectional side elevational view of the construction shown in Figure 1.

Figure 3 is a sectional front elevational view of the construction shown in Figure 1.

Figure 4 is a detail side elevational view of the governor housing showing the cover removed for the sake of clearness.

Figure 5 is a cross sectional view taken through the governor throttle.

Figure 6 is a sectional view taken on the plane indicated by the line 6—6 of Figure 1.

Referring now to the drawings and with special reference to Figure 3 it will be noted that there is illustrated in this figure a fuel feeding device 10 comprising a carburetor 11 having an upwardly extending fuel intake passage 12 and having a chamber 13 surrounding the upper end thereof. Positioned above the carburetor 11 is a fuel intake manifold 14 of conventional design provided with a downwardly extending intake passage 15 arranged in alignment with the passage 12 and surrounded by a chamber 16.

Interpositioned between the carburetor 11 and intake manifold 14 is a suitable governor 17 having a centrally arranged passage 18 therein registering with the passages 12 and 15 and establishing communication therebetween. The governor 17 is also provided with a series of jackets 19 spaced outwardly from the central opening 18 and having oppositely arranged openings 20 therein for establishing communication between the chambers 13 and 16.

The flow of fuel through the intake passage to the manifold 14 is controlled in the present instance by the governor valve 21 thereby eliminating the conventional carburetor throttle. The governor valve 21 is mounted within the fluid passage 18 upon a transversely extending rockshaft 22 having one end extending into the governor housing 23 and the opposite end indirectly connected in a manner to be presently described to one arm 24 of a bell crank lever 25. The latter is pivotally mounted as at 25' upon the carburetor housing and the other arm 26 thereof is connected to suitable manually controlled actuating mechanism designated generally by the character 26'. The arrangement is such as to permit the governor throttle to be manually operated for controlling the flow of fuel to the intake manifold. As is customary in governor practice the valve 21 is also automatically operable by the fuel flowing through the passage 18. In the present instance the force exerted upon the valve by the fuel flowing through the passage 18 tends to close the valve and this force is counteracted by a predetermined force tending to open the same. In other words when the velocity of the fuel flowing through the passage 18 exceeds a predetermined amount the force exerted upon the valve 21 becomes greater than the force tending to hold the valve in open position and as a consequence the valve will be moved by the fluid toward closed position.

The mechanism for normally holding the valve 21 in its open position is illustrated generally in Figure 4 and comprises a spring 27 arranged within the governor housing 23 and operatively connected to the end of the shaft 22 projecting into the housing 23 for normally holding said shaft in a position wherein the valve 21 is open. Thus it will be observed that the spring 27 resists closing of the valve 21 either by the fluid flowing through the passage 18 or by the manually operated mechanism.

In order to secure maximum carburation efficiency a heating medium is caused to circulate around the intake manifold 14 and also around the fuel passage from the carburetor to the manifold. This is accomplished by associating a heating device 28 with the conventional exhaust manifold 29 for by-passing a portion of the exhaust gases into intimate contact with the intake manifold and passage aforesaid. The exhaust manifold 29 is provided with a downwardly extending portion 30 having laterally spaced passages 31 and 32 extending around the intake manifold 14 and communicating with the chamber 16 surrounding the intake passage 15. The amount of exhaust gases by-passed around the intake manifold is controlled in the present instance by a valve 33 arranged within the exhaust manifold 29 above the passages 31 and 32. The valve 33 when in the position illustrated in Figure 3 acts as a baffle for the exhaust gases to direct the same through passages 31 around the intake manifold 14 and through the passages 16, 19, and 13 surrounding the fuel conduits 15, 18 and 12 respectively. After the exhaust gases have been circulated through the passages aforesaid they are permitted to flow out of the opening 32 and be discharged in the usual manner.

The valve 33 is rigidly mounted upon a transversely extending shaft 34 having one end projecting out of the heating device and connected through suitable links illustrated generally at 35 to a crank 36 secured to a stub-shaft 37 arranged in alignment with the shaft 22 and operatively connected to the latter by means of a lever 38 secured to the shaft 37 in spaced relation to the crank 36 and adapted to be engaged by a dog 39 secured to the adjacent end of the shaft 22. The arrangement is such as to permit actuation of the valve 21 by fluid pressure without effecting the manually controlled mechanism. As shown in Figure 1 the crank 36 is connected to the arm 24 of the bell crank 25 by the link 40 so that when the latter is actuated both the valves 21 and 33 will be controlled.

The above construction is such that as the throttle valve 21 approaches the wide open position the valve 33 is opened slightly permitting a portion of the exhaust gases to flow directly out of the exhaust manifold and thereby reduce the temperature within the intake passage. Thus it will be observed that the amount of exhaust gases by-passed through the jackets is controlled by the operation of the governor throttle valve.

What we claim as our invention is:

In a device of the class described, a carburetor having an induction conduit, a throttle in said conduit for controlling the flow of fluid therethrough, and adapted to be moved toward closed position by the fluid pressure in the conduit, yieldable means for resisting closing of said throttle, means for heating the fluid passing through said conduit, means for controlling the operation of said heating means, and means for manually closing said throttle and simultaneously operating said heat control.

In testimony whereof we affix our signatures.

EDWIN R. MAURER.
DONALD M. FERGUSON.